US010227059B2

(12) United States Patent
Casagrande et al.

(10) Patent No.: US 10,227,059 B2
(45) Date of Patent: Mar. 12, 2019

(54) PROCESS AND SYSTEM FOR SECURE ACCESS TO A DETERMINED SPACE BY MEANS OF A WEARABLE OBJECT

(71) Applicant: The Swatch Group Research and Development Ltd, Marin (CH)

(72) Inventors: Arnaud Casagrande, Bole (CH); Carlos Velasquez, Neuchatel (CH); Philippe Duc, Avenches (CH)

(73) Assignee: The Swatch Group Research and Development Ltd, Marin (CH)

( * ) Notice: Subject to any disclaimer, the term of this patent is extended or adjusted under 35 U.S.C. 154(b) by 0 days.

(21) Appl. No.: 15/723,497

(22) Filed: Oct. 3, 2017

(65) Prior Publication Data
US 2018/0093642 A1   Apr. 5, 2018

(30) Foreign Application Priority Data

Oct. 5, 2016 (EP) ..................................... 16192418

(51) Int. Cl.
*G07C 9/00* (2006.01)
*B60R 25/24* (2013.01)
(Continued)

(52) U.S. Cl.
CPC .............. *B60R 25/24* (2013.01); *G01S 13/32* (2013.01); *G01S 13/825* (2013.01); *G06F 21/34* (2013.01);
(Continued)

(58) Field of Classification Search
CPC ........... G01S 13/08; H04Q 5/22; G05B 11/01; G08C 19/16; G07C 9/00
(Continued)

(56) References Cited

U.S. PATENT DOCUMENTS 5,737,697 A * 4/1998 Yamada ............... H03G 3/3047
330/279
6,538,560 B1   3/2003 Stobbe et al.
(Continued)

FOREIGN PATENT DOCUMENTS

EP   1 152 108 A2   11/2001
WO   WO 01/25060 A2   4/2001

OTHER PUBLICATIONS

European Search Report dated Apr. 4, 2017 in European Application 16192418.8, filed on Oct. 5, 2016 (with English Translation of Categories of cited documents & Written Opinion).

*Primary Examiner* — Nam V Nguyen
(74) *Attorney, Agent, or Firm* — Oblon, McClelland, Maier & Neustadt, L.L.P.

(57) ABSTRACT

In the case of the process for secure access to a determined space, it is provided that after activation of the wearable object, a first coded signal is transmitted from the access or unlocking device, this first coded signal is received in the object and a coded response signal is transmitted with synchronization to the device after a defined time of transmission. A processing of the coded response signal converted in the processing unit of the device is conducted in order to check the defined time delay and the response code of the wearable object and to determine the flight times of the signals between the device and the wearable object. The distance separating the wearable object and the access or unlocking device is thus calculated to authorize access to the determined space if the calculated distance is below a determined threshold after recognition of the wearable object.

19 Claims, 5 Drawing Sheets

(51) Int. Cl.
   *G01S 13/32* (2006.01)
   *G01S 13/76* (2006.01)
   *G01S 13/82* (2006.01)
   *G06F 21/34* (2013.01)

(52) U.S. Cl.
   CPC .......... *G07C 9/00309* (2013.01); *G01S 13/76* (2013.01); *G01S 13/82* (2013.01); *G07C 2009/00333* (2013.01); *G07C 2009/00373* (2013.01); *G07C 2009/00396* (2013.01); *G07C 2009/00412* (2013.01); *G07C 2009/00555* (2013.01); *G07C 2009/00793* (2013.01); *G07C 2209/06* (2013.01)

(58) Field of Classification Search
   USPC ............. 340/5.72, 10.1–10.5, 12.22, 426.17; 342/124, 118, 134; 370/339; 726/16; 380/270
   See application file for complete search history.

(56) References Cited

U.S. PATENT DOCUMENTS

| | | | | |
|---|---|---|---|---|
| 6,803,851 B1* | 10/2004 | Kramer | ................... | B60R 25/24 340/12.51 |
| 7,456,726 B2* | 11/2008 | Hansen | ................ | G06K 7/0008 340/10.2 |
| 7,466,219 B2* | 12/2008 | Ishimura | ................. | B60R 25/24 340/435 |
| 7,944,340 B1* | 5/2011 | Ghabra | ................... | B60R 25/00 307/10.1 |
| 7,978,049 B2* | 7/2011 | Leitch | ..................... | B60R 25/24 340/5.72 |
| 7,988,055 B2* | 8/2011 | Garber | ............... | G06K 7/10336 235/492 |
| 8,204,031 B2* | 6/2012 | Jian | ...................... | H04B 1/0057 333/132 |
| 8,723,720 B2* | 5/2014 | Moffatt | ................ | G01S 13/825 342/118 |
| 8,826,415 B2* | 9/2014 | Last | ....................... | G06F 21/35 726/16 |
| 8,965,301 B2* | 2/2015 | Kluge | .................... | G01S 11/02 455/258 |
| 9,426,660 B2* | 8/2016 | McCormack | ....... | H04L 63/0428 |
| 9,709,672 B2* | 7/2017 | Manku | ..................... | G01S 13/74 |
| 9,894,613 B2* | 2/2018 | Scheim | ............. | H04W 52/0245 |
| 2007/0120742 A1* | 5/2007 | Soler Castany | ..... | H01Q 1/2283 343/700 MS |
| 2008/0284564 A1* | 11/2008 | Leitch | ..................... | B60R 25/24 340/5.61 |
| 2009/0006032 A1 | 1/2009 | Wilcox et al. | | |
| 2010/0074240 A1* | 3/2010 | Jian | ...................... | H04B 1/0057 370/339 |
| 2010/0265035 A1* | 10/2010 | Ziller | ................. | G07C 9/00309 340/5.72 |
| 2016/0112846 A1 | 4/2016 | Siswick et al. | | |
| 2016/0156419 A1* | 6/2016 | Druml | ................... | H04W 4/023 398/40 |
| 2017/0357788 A1* | 12/2017 | Ledvina | ................ | G06F 21/31 |
| 2018/0088222 A1* | 3/2018 | Anholt | ................. | H04W 4/029 |

* cited by examiner

PROCESS AND SYSTEM FOR SECURE ACCESS TO A DETERMINED SPACE BY MEANS OF A WEARABLE OBJECT

This application claims priority from European Patent Application No. 16192418.8 filed on Oct. 5, 2016, the entire disclosure of which is hereby incorporated herein by reference.

FIELD OF THE INVENTION

The invention relates to a process for secure access to a determined space such as a vehicle by means of a personalised wearable object such as a personalised electronic key.

The invention relates to a secure access system for implementation of the secure access process.

BACKGROUND OF THE INVENTION

In the field of secure access to a determined space such as vehicles, it is known to use an entry system for the vehicles using a smart key for wireless transmission of commands. By means of the access system, it is possible to authorise access to this space to a person wearing a personalised wearable object such as an electronic key on the basis of a check or authentication of the personalised electronic key. An interrogation signal can firstly be transmitted from an access authorisation or unlocking device of the vehicle to the personalised electronic key. As soon as this interrogation signal is received, the electronic key can be activated and a calculation of a response signal is conducted in said electronic key before a coded transmission to the access authorisation device of the vehicle. A control is subsequently conducted in the access device of the vehicle to determine whether the key is properly recognised for opening of said vehicle.

For control of access to a vehicle, for example, by means of an electronic smart key, the unlocking device of the vehicle can firstly be activated by a mechanical action, for example, on the door handle of the vehicle. From this moment, the unlocking device transmits a coded interrogation signal, which is received by the electronic key to activate it. The electronic key can be supplied with power by its own energy source such as a battery. In general, this interrogation signal is transmitted from the vehicle at a low carrier frequency, whereas the coded response signal of the electronic key is transmitted at a high carrier frequency.

The electronic key comprises a processing unit or a digital processing unit, which is connected to storage devices in which an encryption algorithm and/or an identification code for access to the vehicle, for example, are stored. Once activated by the interrogation code signal, the electronic key transmits its coded identification signal to the vehicle for a command for locking or unlocking parts or functions of the vehicle.

To facilitate access to the vehicle without having to handle the electronic key, an electronic key has already been proposed, from which a response signal is automatically transmitted to the vehicle in accordance with an interrogation signal received from the vehicle. For this, the key must be located in a confined area around the vehicle to be able to receive this interrogation signal coming from the vehicle. Moreover, the key only transmits a response signal to the vehicle if the interrogation signal has been recognised by the key. This response signal thus allows the command for locking and unlocking parts or functions of the vehicle.

The reception limits of the signals are determined by the propagation characteristics of the radiofrequency signals used for the exchanges of information and by the characteristics of the power transmitted and sensitivity of the transmitter-receivers used in the vehicle and in the key. The confined zone around the vehicle is generally defined by a threshold of minimum power received.

With such an electronic key automatically controlled by the interrogation signal coming from the vehicle there is a risk of allowing the vehicle, to be opened by means of intermediate relays without the knowledge of the wearer of the electronic key. This provides ill-intentioned persons with the ability to use these intermediate relays between the vehicle and the wearer of the electronic key to open the vehicle and start it. These relays are capable of reproducing the coded interrogation signal or coded response signal going to the key or to the vehicle respectively, each of which signals comprise a sequence of binary data.

A first intermediate relay of a first ill-intentioned person is close to the vehicle to receive an interrogation signal from the vehicle. This interrogation signal is converted into a radiofrequency signal for transmission to a second intermediate relay of a second ill-intentioned person located close to the wearer of the personalised electronic key for the vehicle to be opened and started. The second intermediate relay once again converts the radiofrequency signal of the first intermediate relay into a new interrogation signal at low frequency. The personalised electronic key worn by the person authorised to access the vehicle receives the new interrogation signal and after recognition of this interrogation signal transmits a coded identification response signal at high frequency. This radiofrequency response signal of the electronic key can be received directly by the unlocking device of the vehicle if the distance from the vehicle is short, e.g. less than 50 m. However, if the distance between the electronic key and the vehicle is much greater, e.g. more than 1 km, there must be a further exchange of radiofrequency signals from the key and via the two intermediate relays to the vehicle.

The secure access systems known from the art encounter several problems to ensure that the vehicle is opened solely by the personalised electronic key. In particular, it is generally difficult to determine the distance separating the electronic key and the vehicle to authorise opening of the vehicle only by the electronic key at a short distance from the vehicle. This constitutes a disadvantage of the secure access systems of the prior art.

Patent EP 673 003 B1 describes a system for secure access to a vehicle by means of an electronic key. Following action on the handle of the vehicle, the unlocking device of the vehicle transmits a coded interrogation signal for the key, which receives it and transmits a coded response signal to the unlocking device. In the case where the response code transmitted by the key coincides with a reference code of the unlocking device, authorisation for access to the vehicle is effected. A distance detection device is also provided to measure the distance between the key and the vehicle to enable the key to transmit the response code only in the vicinity of the vehicle. Such a secure access system does not eliminate the possibility of unauthorised opening of the vehicle by intermediate relays, which constitutes a disadvantage.

U.S. Pat. No. 6,538,560 B1 describes a system for access to an unlocking device of a vehicle by means of an electronic transponder key. The device of the vehicle transmits a coded signal at low frequency to activate the electronic key and allow it to activate its transmitter and receiver unit at high frequency. A high-frequency coded interrogation signal is then transmitted and received by the key, which must check its validity. Processing of the low-frequency coded signal is conducted in the key to allow transmission of a coded response signal at high frequency, taking into account the identification of the transmitter. The device of the vehicle receives the high-frequency coded signal from the key to check its validity and authorise access to the vehicle upon affirmation. Processing of the coded signal received from the unlocking device of the vehicle must be conducted in the key, which requires complicated circuitry in the key and increases the power consumption of the battery-supplied key, which constitutes a disadvantage.

In the prior art, it is also known to use a UWB communication system to authorise access to a vehicle by an electronic smart key. With this type of UWB communication, the flight time of the signals from the vehicle to the key and from the key to the vehicle, and therefore the distance between these two entities, is determined precisely. In contrast, this type of radiofrequency link also involves the use of a digital signal processing (DSP) microprocessor both in the unlocking device of the vehicle and in the electronic key. This requires a complex technology and therefore a high electrical energy consumption. Therefore, this constitutes a disadvantage of such an access system. Moreover, in such a system the distance measurement phase is generally distinguished from the authentication phase and this allows a potential attack, in which only the distance measurement phase could be hacked.

SUMMARY OF THE INVENTION

Therefore, the aim of the invention is to propose a process for secure access to a determined space by means of a personalised wearable object to remedy the disadvantages of the prior art for easy and secure access to the determined space by means of the wearable object during transmission of at least one response signal.

For this purpose, the invention relates to a process for secure access to a determined space equipped with an access or unlocking device by means of a personalised wearable object through a wireless signal communication, wherein the access or unlocking device comprises a transmitter of radiofrequency signals at high frequency, a receiver of radiofrequency signals at high frequency, a processing unit and a local oscillator for clocking the operations of the access or unlocking device, and the wearable object comprises a transmitter of radiofrequency signals at high frequency, a receiver of radiofrequency signals at high frequency, a processing unit and a local oscillator for clocking the operations of the wearable object,
wherein the process comprises the steps of:
activating the wearable object,
transmitting a first coded signal from the access or unlocking device,
receiving the first coded signal from the access or unlocking device in the wearable object to demodulate the code and prepare a coded response signal in order to transmit this coded response code with synchronisation to the access or unlocking device after a defined time of transmission following initiation of the first coded signal in the access or unlocking device,
receiving the coded response signal from the wearable object in the access or unlocking device,
processing the converted coded response signal in the processing unit of the access or unlocking device by checking the defined time delay and the response code of the wearable object in order to determine the flight times of the signals between the access or unlocking device and the wearable object and deducing therefrom the distance separating the wearable object and the access or unlocking device to authorise access to the determined space if the calculated distance is below a determined threshold after recognition of the wearable object.

Particular steps of the process are mentioned in dependent claims 2 to 14.

An advantage of the process lies in the fact that communication times or flight times of the transmitted signals between the access device of a determined space and the personalised wearable object are determined. Since a good command of the time delay in the access or unlocking device and in the wearable object is obtained for management of the signals, it is easy to determine the distance separating the wearable object from the access or unlocking device sufficiently precisely upon response from the wearable object. This enables any request coming from intermediate relays to be rejected when the determined distance exceeds a determined threshold. This therefore prevents access to the determined space by intermediate relays of ill-intentioned persons.

Advantageously, the transmitted coded signals can be at a high transfer rate, e.g. at 26 Mbits/s or 125 Mbits/s. With such high transfer rates, the edges of the data in the transmitted and received signal are firmer than at an average transfer rate. For this reason, determination of the distance separating the wearable object and the access or unlocking device can be obtained with higher precision. Thus, a higher security for authorisation of access to the determined space by a personalised wearable object can be guaranteed.

Advantageously, signal reception windows that are well defined in time following the synchronisation of the device and the wearable object allow complete reception of the response signal transmitted by the wearable object or by the unlocking device. Access to the determined space by intermediate relays in connection with the interrogated wearable object can thus be prevented.

A large part of the secure access control of the wearable object such as the electronic key is carried out in a digital signal processing unit in the access or unlocking device for the determined space such as a vehicle. This greatly simplifies the circuitry of the electronic key and also reduces its electric power consumption, as it is supplied by a small-dimension battery. Moreover, since the communication link used is narrow band mainly on a single communication frequency, this also simplifies the radiofrequency components used. The electronic key is only activated at the moment of the control of secure access to the vehicle.

The secure access system uses a narrow-band radiofrequency technology that can be implemented in industrial, scientific and medical (ISM) radio bands without licence. The system has narrow-band antennas, which have a higher gain than that of the antennas of a UWB system, and this makes the system of the present invention for implementing the secure access process more economical than UWB technology.

For this purpose, the invention also relates to a system for secure access to a determined space by a wearable object for implementing the access process, in which the system comprises an access or unlocking device, a personalised wearable object for a wireless signal communication with the access or unlocking device, wherein the access or unlocking device comprises a transmitter of radiofrequency signals at high frequency, a receiver of radiofrequency signals at high frequency, a processing unit and a local oscillator for clocking the operations of the access or unlocking device, and the wearable object comprises a transmitter of radiofrequency signals at high frequency, a receiver of radiofrequency signals at high frequency, a processing unit and a local oscillator for clocking the operations of the wearable object.

Particular embodiments of the access system are defined in dependent claims 16 to 19.

BRIEF DESCRIPTION OF THE DRAWINGS

The aims, advantages and characteristics of the process and system for secure access to a determined space such as a vehicle by means of a personalised wearable object such as an electronic key will become clearer in the following description through the drawings.

DETAILED DESCRIPTION OF THE INVENTION

In the following description all the components of the secure access system for implementing the secure access process that are well known to a person skilled in the art in this technical field are only described in a simplified manner.

Figure 1:
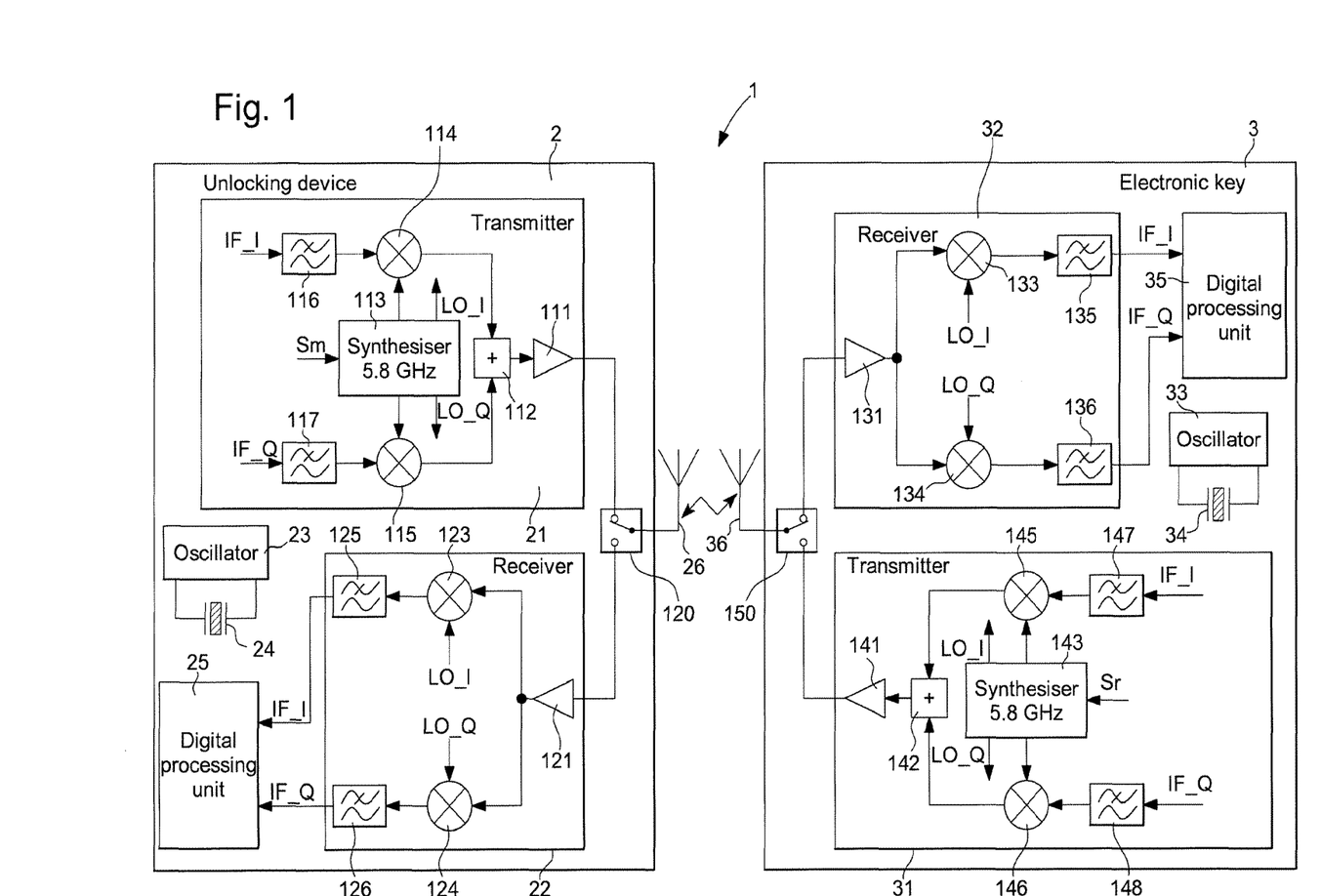
FIG. 1 shows an embodiment of a system for secure access to a determined space for implementing the access process according to the invention.

FIG. 1 shows an embodiment of the system 1 for secure access to a determined space by a wearable object for implementing the secure access process. In this embodiment of the secure access system 1, the determined space is a vehicle equipped with an access or unlocking device 2 of the vehicle, and the wearable object is preferably an electronic smart key 3 to be worn by a user of the vehicle.

Of course, another determined space is possible, such as a bus, a room in a secure building, a safe or any other space where entry is only authorised to authorised persons with their personalised wearable object. Moreover, the wearable object 3 can also be a card, badge, watch, ring, mobile telephone or any other object that can contain an electronic circuit capable of establishing a communication with the access or unlocking device 2.

According to the process for secure access to the vehicle by the electronic key 3, the distance separating the personalised electronic key 3 and the access or unlocking device 2 must be detected sufficiently precisely. Upon activation of the electronic key 3, a time-shifted or delayed transmission or reception of radiofrequency control or data signals, which can be coded, occurs from the unlocking device 2 to the electronic key 3 and vice versa. A merger of distance information in a coded response signal of the electronic key 3 transmitted to the unlocking device 2 can also be conducted to prevent any attack by intermediate relays. A digital processing of the signals is conducted in the unlocking device 2 in order to recognise the electronic key 3 as well as partially in the electronic key 3 in order to allow the vehicle to be opened and started. Thus, the flight time of the signals between the device and the key and vice versa, and from this the distance separating the access device and the electronic key, are determined precisely in the unlocking device 2 to authorise access to the vehicle.

The access or unlocking device 2 of the access system 1 comprises in particular a transmitter 21, a receiver 22 and at least one digital processing unit 25 for signals that is connected to the transmitter 21 and to the receiver 22. In this embodiment, a single antenna 26 is connected to the transmitter 21 and to the receiver 22 by means of a switching element 120. The switching element 120 is a multiplexer with two inputs that are respectively connected to the transmitter 21 and to the receiver 22 and one output connected to the antenna 26. This multiplexer 120 is controlled by the processing unit 25 to enable either the transmission of high-frequency signals through the antenna 26 from the transmitter 21 or the reception of high-frequency signals through the antenna 26 to the receiver 22. A local oscillator 23, which is preferably an oscillator with a quartz crystal 24, is also provided to clock the operations of the unlocking device 2.

The digital processing unit 25 can comprise (not shown) a microprocessor clocked by the local oscillator 23, a multiple register memory, a symmetric or asymmetric encryption system with a random number generator, as well as an encryption key management system. The digital processing unit 25 can also comprise (not shown) an analog to digital converter ADC to convert intermediate signals into intermediate digital signals, an envelope detector of the intermediate digital signals, a time lag element, a signal frequency modulation generator. The digital processing unit 25 also comprises a digital to analog converter DAC to convert digital signals to be transmitted to the electronic key 3.

The electronic key 3 of the access system 1 comprises in particular a transmitter 31, a receiver 32 and at least one digital processing unit 35, which is connected to the transmitter 31 and to the receiver 32. In this embodiment, a single antenna 36 is connected to the transmitter 31 and to the receiver 32 by means of a switching element 150. The switching element 150 is a multiplexer with two inputs that are respectively connected to the transmitter 31 and to the receiver 32 and one output connected to the antenna 36. This multiplexer 150 is controlled by the digital processing unit 35 to enable either the transmission of high-frequency signals through the antenna 36 from the transmitter 31 or the reception of high-frequency signals through the antenna 36 to the receiver 32, as in the case of the access or unlocking device 2.

A local oscillator 33, which is preferably an oscillator with a quartz crystal 34, is also provided to clock the operations in the electronic key 3 and principally the processing by means of the digital processing unit 35. The oscillation signal of the local oscillator 33 can be at a frequency in the order of 26 MHz or at a frequency divided by a divider by-two assembly. This local oscillator 33 is similar to the quartz crystal 24 local oscillator 23 of the unlocking device 2. Therefore, the frequency of the oscillation signal is substantially similar to ±40 ppm. This can permit a good processing synchronisation in the unlocking device 2 and in the electronic key 3 after an initial calibration step or during the secure access process explained below.

The digital processing unit 35 can comprise (not shown) a processor or a finite state machine clocked by the local oscillator 33, a multiple register memory, a symmetric or asymmetric encryption system with a random number generator, as well as an encryption key management system. The digital processing unit 35 can also comprise (not shown) an analog to digital converter ADC to convert intermediate signals into intermediate digital signals, an envelope detector of the intermediate digital signals, a time lag element, a signal frequency modulation generator. The digital processing unit 35 also comprises a digital to analog converter to convert digital signals to be transmitted to the unlocking device 2.

Following an activation command coming from a door handle of the vehicle, for example, or a command transmitted by the electronic key 3, the transmitter 21 of the access or unlocking device 2 is able to transmit a control or data signal through the antenna 26 to the antenna 36 of the electronic key 3 explained in detail below. In the case of an activation command coming from the vehicle, the activation signal transmitted by the device is a low-frequency signal LF. In contrast, if the activation command comes from the electronic key 3, the listening access or unlocking device 2 will transmit a high-frequency control or data signal. This high frequency in this embodiment of the access system 1 can be at an ISM frequency at 5.8 GHz, for example. The receiver 22 is able to receive through the receiving antenna 26 a radiofrequency signal at the same carrier frequency coming from the interrogated electronic key 3.

In the access or unlocking device 2, the transmitter 21 comprises a frequency synthesiser 113, which is also used for the receiver 22. The frequency synthesiser 113 receives a reference signal from the quartz crystal 24 oscillator 23. The frequency synthesiser 113 is capable of supplying high-frequency oscillating signals to a first mixer 114 and to a second mixer 115. The first mixer 114 receives from the digital processing unit 25 at least one in-phase intermediate signal IF_I, which is filtered in a low-pass filter 116 for frequency up-conversion of this intermediate signal by a first oscillating signal of the frequency synthesiser 113. The second mixer 115 receives from the digital processing unit 25 at least one in-quadrature intermediate signal IF_Q, which is filtered in a low-pass filter 117 for frequency up-conversion of this intermediate signal by a second oscillating signal of the frequency synthesiser 113. The output signal of the first mixer 114 and the output signal of the second mixer 115 are added in an adder 112 of the transmitter 21. An output amplifier 111 is connected at output of the adder 112 to amplify the radiofrequency output signal to be transmitted through the first antenna 26 by means of the multiplexer 120 in transmission mode.

It should be noted that the first oscillating signal supplied by the frequency synthesiser 113 of the transmitter 21 is an in-phase oscillating signal, whereas the second oscillating signal is an in-quadrature oscillating signal. This is provided for a respective mixture with the filtered in-phase intermediate signal IF_I and the filtered in-quadrature intermediate signal IF_Q. The frequency synthesiser 113 is therefore provided to generate in-phase and in-quadrature oscillating signals at a frequency close to 5.8 GHz for the two mixers 114, 115.

As will be explained below with reference to FIGS. 2 to 6, each intermediate signal IF_I and IF_Q can comprise a modulation of a variable or rolling code to be transmitted through the first antenna 26 by means of the multiplexer 120 in transmission mode. This can be an FSK or GFSK frequency modulation for this rolling code. However, it may also be provided to modulate the frequency of each oscillating signal supplied by the synthesiser 113 by a modulation signal Sm transmitted by the digital processing unit 25. A PSK or BPSK phase modulation can also be provided, as well as a modulation of a pseudo-random noise sequence (PN) used in intermediate steps of the process, for example, to determine the distance between the unlocking device 2 and the electronic key 3.

In the access or unlocking device 2, the receiver 22 comprises a low input noise amplifier 121 to receive a radiofrequency signal from the antenna 26 by means of the multiplexer 120 in receive mode. The low input noise amplifier 121 of the receiver 22 enables the received radiofrequency signal to be amplified and filtered. A first mixer 123 of the receiver 22 is provided for frequency conversion of the amplified and filtered radiofrequency signal by an in-phase oscillating signal LO_I coming from the frequency synthesiser 113 in order to supply an in-phase intermediate signal IF_I. This in-phase intermediate signal IF_I is filtered by a low-pass filter 125. A second mixer 124 of the receiver 22 is provided for frequency conversion of the amplified and filtered radiofrequency signal by an in-quadrature oscillating signal LO_Q of the frequency synthesiser 113 in order to supply an in-quadrature intermediate signal IF_Q. The in-quadrature intermediate signal IF_Q is filtered by another low-pass filter 126. The filtered in-phase IF_I and in-quadrature IF_Q intermediate signals are transmitted to the digital processing unit 25.

In the digital processing unit 25, there is firstly an analog to digital converter ADC (not shown) to convert the intermediate signals into intermediate digital signals to be processed in the processing unit 25. The processing unit 25 can also comprise (not shown) an envelope detector of the intermediate digital signals, at least one storage unit such as a multiple register nonvolatile memory, and a digital to analog converter to convert digital signals to be transmitted. The processing unit 25 is clocked by a timing signal supplied by the local oscillator 23, which can be at a frequency in the order of 26 MHz or at a frequency divided by a divider by-two assembly.

In the electronic key 3, there is also only one frequency synthesiser 143 to generate in-phase and in-quadrature oscillating signals at a frequency close to 5.8 GHz. In the transmitter 31 of the electronic key 3, the frequency synthesiser 143 supplies an in-phase oscillating signal to a first mixer 145 to raise the frequency of the in-phase intermediate signal IF_I to be transmitted, which is filtered in a low-pass filter 147 when coming from the digital processing unit 35. The frequency synthesiser 143 supplies an in-quadrature oscillating signal to a second mixer 146 to raise the frequency of the in-quadrature intermediate signal IF_Q to be transmitted, which is filtered in a low-pass filter 148 when coming from the digital processing unit 35. The output signals of the two mixers are added in an adder 142 before being amplified by an amplifier 141, the output of which is connected to a switching element 150 connected to the single antenna 36 for the transmission and reception of signals. In accordance with a command for switchover of transmission to the switching element 150 in particular by the digital processing unit 35, there is a transmission of a signal supplied by the transmitter 31 through the antenna 36 in the transmission mode. This switching element 150 is preferably a multiplexer with two inputs and one output linked to the antenna 36 with a switching command coming from the digital processing unit 35 clocked by a timing signal coming from the local oscillator 33. One input of the multiplexer is connected to the transmitter 31, while the other input is connected to the receiver 32.

The receiver 32 comprises a low-noise amplifier 131 connected to an input of the multiplexer 150 in receive mode. The output signal of the amplifier 131 is supplied to a first mixer 133 and to a second mixer 134. The frequency synthesiser 143 also supplies an in-phase oscillating signal LO_I for the first mixer 133 of the receiver 32 and an in-quadrature oscillating signal LO_Q for the second mixer 134 of the receiver 32. A first in-phase intermediate signal IF_I is supplied at output of the first mixer 133 at a reduced frequency and a second in-quadrature intermediate signal IF_Q is supplied at output of the second mixer 134 at a reduced frequency. The in-phase intermediate signal IF_I is filtered in a low-pass filter 135 and transmitted to the digital processing unit 35. The in-quadrature intermediate signal IF_Q is filtered in a low-pass filter 136 and transmitted to the digital processing unit 35.

In an initial phase following the activation command performed on an element of the vehicle, a low-frequency LF activation signal can firstly be transmitted through the first antenna 26 of the transmitter 21 to wake up the electronic key 3 in the vicinity of the vehicle. However, it can also be provided to activate said electronic key 3 by means of a pushbutton that it comprises or by means of another control element of said key such as a touch key. On reception of the activation signal of the electronic key 3, the access or unlocking device 2 can transmit a high-frequency interrogation signal to the electronic key 3, for example. The different steps of the process that follow this initial step are explained in more detail below.

It should be noted that a pseudo-random noise generator can be provided in the unlocking device 2, as described in patent EP 2 796 988 B1 with reference to FIG. 2 and paragraphs 33 to 37. This generator can be clocked by the oscillator 23 in order to generate a pseudo-random noise code in connection with the processing unit 25. Such a generator can also be provided in the processing unit of the electronic key 3. The generation of a rolling code is already known in the field of garage door opening.

Figure 2:
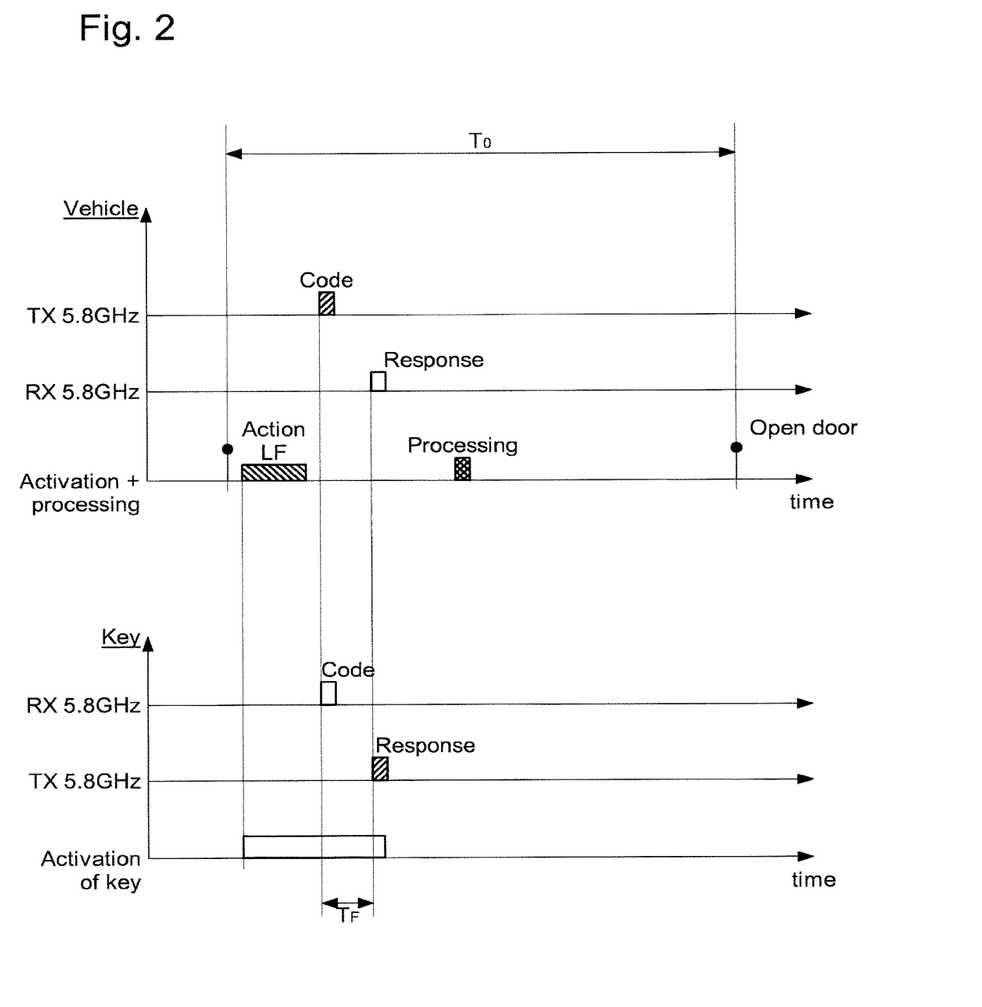
FIG. 2 shows different signals transmitted and received between the access device and the wearable object of the access system of FIG. 1 according to a first variant of the secure access process according to the invention.

According to a first variant of the secure access process according to FIG. 2, there must at least be a transmission of a first coded signal such as a base signal for rolling code or modulation of a pseudo-random noise sequence from the unlocking device 2 to the electronic key 3. This coded base signal can be transmitted after a determined time interval following the LF activation of the electronic key. During the transmission of the unlocking device a precise time delay can be locked into the clocked device by the quartz crystal oscillator or at a higher frequency on the basis of the local oscillator, e.g. at 250 MHz.

The electronic key receives this first base signal and demodulates it in defining the time. The electronic key then generates a second coded signal such as a coded response signal after a first defined time of transmission $T_F$ properly determined from initiation of the base signal in the unlocking device. This first defined time of transmission $T_F$, which can be in the order of 0.1 ms, is obtained by the time delay following reception of the base signal and as a result of a local oscillator similar to that of the unlocking device. This coded response signal is received by the unlocking device. A time-shifted processing operation is conducted, i.e. after a time laps in the unlocking device to determine the flight times between the two entities and the first defined response time of the electronic key. Since the time delay is very precise in the device and in the key and the base signal and the coded response signal are transmitted at a high transfer rate, e.g. at 26 Mbits/s, it is easy to determine the real distance separating the electronic key and the vehicle. Moreover, this guarantees a high surety in preventing the vehicle from being opened by means of intermediate relays of ill-intentioned persons.

At the end of the transmission of the coded response signal from the electronic key 3, the electronic key 3 can be automatically deactivated and remain in a resting mode. The control of the time delay and the response code of the electronic key 3 can be performed with time delay in the processing unit 25 of the access or unlocking device 2 after deactivation of the electronic key. A command for opening the door of the vehicle can be actuated subsequently. The time To between the activation of the electronic key 3 and the opening of the door of the vehicle can be in the order of 1 ms.

Figure 3:
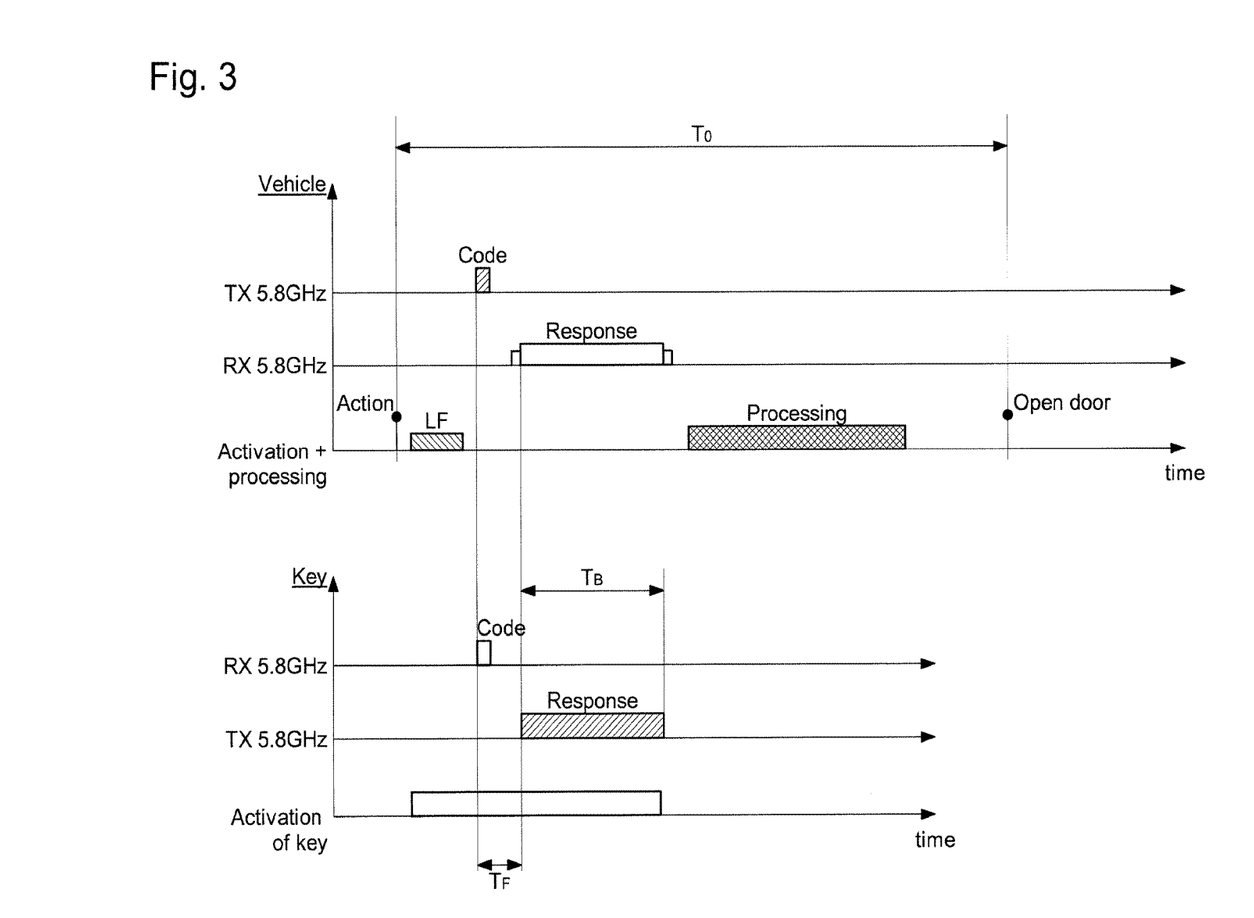
FIG. 3 shows different signals transmitted and received between the access device and the wearable object of the access system of FIG. 1 according to a second variant of the secure access process according to the invention.

According to a second variant of the secure access process according to FIG. 3, there is a transmission of a base signal with the rolling code or modulation of a pseudo-random noise sequence from the unlocking device 2 to the electronic key 3. As previously, this coded base signal can be transmitted after a determined time interval following the activation of the electronic key. Upon generation of the base signal for its transmission from the unlocking device, a precise time lag is locked into the clocked device by the quartz crystal oscillator or at a higher frequency on the basis of the local oscillator, e.g. at 250 MHz.

The electronic key receives this coded base signal and demodulates it in defining the time. The electronic key then generates a coded response signal after a first defined time of transmission $T_F$ properly determined from initiation of the base signal Code in the unlocking device. This first defined time of transmission $T_F$, which can be in the order of 0.1 ms, is obtained by the time delay following reception of the base signal and as a result of a local oscillator similar to that of the unlocking device.

This coded response signal is a scrambled coded signal with an additional modulation on the received coded base signal or an encrypted signal with a symmetric or asymmetric encryption key programmed or generated beforehand. The generation of this scrambled coded response signal is longer than that of the first variant of the access process. The modulation can be at 1 Mbits/s in the coded response signal, which is at a frequency of 5.8 GHz, for example. The duration $T_B$ of this scrambled coded response signal can be in the order of 0.25 ms.

This scrambled coded response signal is received by the unlocking device in a determined time window for reception in the unlocking device. The device is arranged to receive the scrambled coded response signal in this time window or time interval. The duration of this time window for reception is equivalent to that $T_B$ of the scrambled coded response signal.

After complete reception of the scrambled coded response signal, a processing operation is conducted in the processing unit of the unlocking device. In the processing unit the coded response signal received from the electronic key is compared with the version generated locally on the basis of the initial code. After this, the flight times between the two entities and also the first defined response time $T_F$ of the electronic key are determined. Since the time delay is very precise in the device and in the key and the base signal and the coded response signal are transmitted at a high transfer rate, e.g. at 26 Mbits/s, it is easy to determine the real distance separating the electronic key and the vehicle. This also guarantees access to the vehicle only by the electronic key in the vicinity of the vehicle for high security.

As for the first variant of the process, at the end of the transmission of the scrambled coded response signal from the electronic key, the electronic key can be automatically deactivated to remain in a resting mode. A command for opening the door of the vehicle can then be actuated after processing in the processing unit. The time $T_0$ between the activation of the electronic key and the opening of the door of the vehicle can be in the order of 10 ms.

In the variants of the secure access process described with reference to FIGS. 4 and 5, there must always be a transmission of a first coded signal from the unlocking device to the wearable object, which is the electronic key. Then, there is a coded response signal transmitted with time delay by the unlocking device to the electronic key. A processing of the information received in the electronic key enables it to transmit a scrambled coded response signal to the unlocking device for checking and authorisation access to the vehicle on recognition of the electronic key and its distance from the vehicle.

Figure 4:
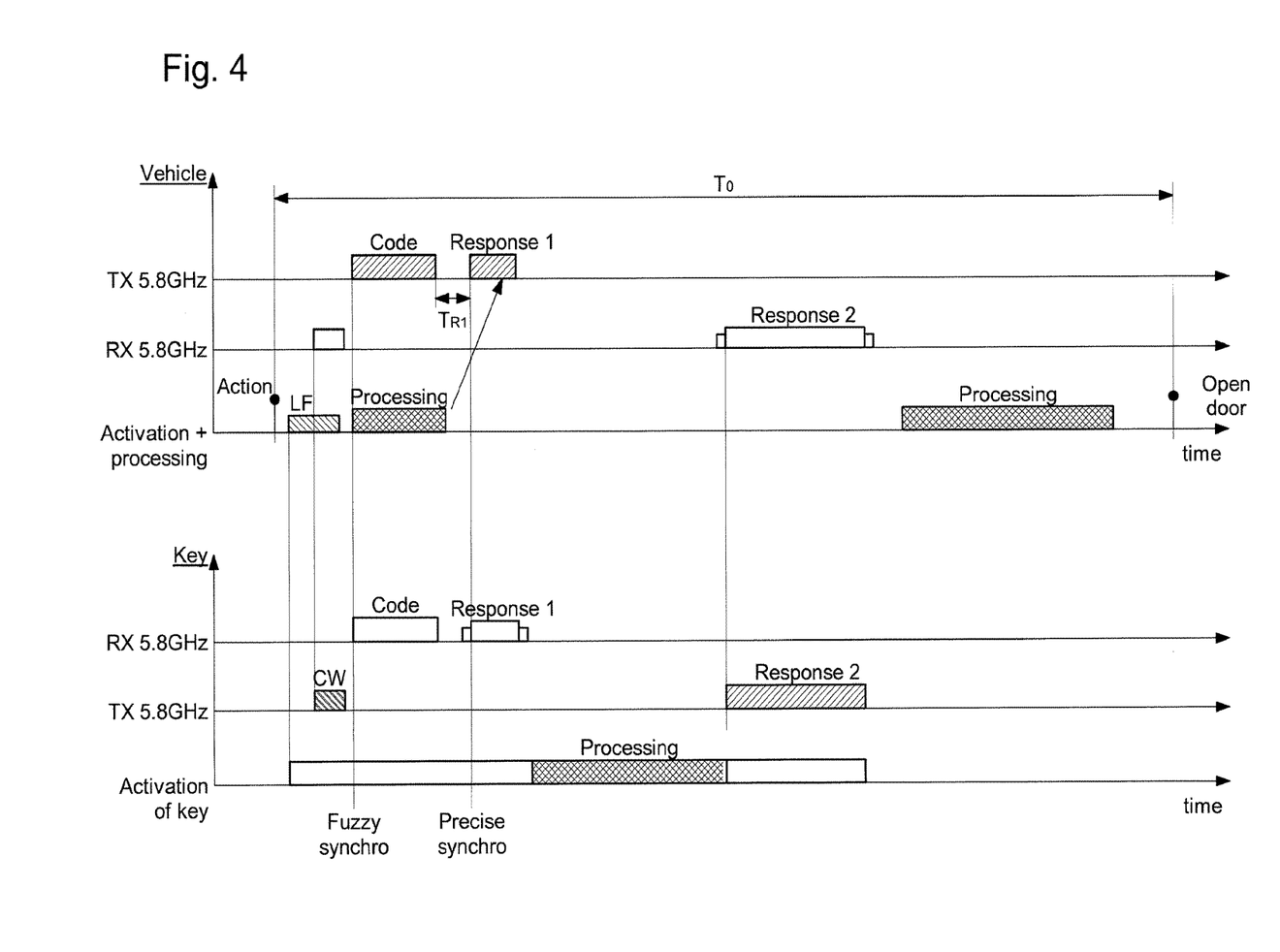
FIG. 4 shows different signals transmitted and received between the access device and the wearable object of the access system of FIG. 1 according to a third variant of the secure access process according to the invention.

According to a third variant of the secure access process according to FIG. 4, a double scrambled transfer of data is provided in the electronic key. Firstly, the electronic key is activated by the LF low-frequency signal transmitted by the unlocking device. After activation of the electronic key, it can be provided to transmit a continuous signal at carrier frequency CW in the order of 5.8 GHz, for example, from the electronic key. The unlocking device receives this signal at carrier frequency, which will serve to calculate the frequency error of the electronic key, for example, by a fast Fourier transform in the processing unit.

The unlocking device then transmits a base signal Code, which is a rolling code signal at an average rate in the order of 1 Mbits/s or a rolling code or randomly encrypted signal with a symmetric or asymmetric key. This transmission of the base signal is longer than the transmission of the base signal of the first and second variants of the process, e.g. in the order of 1 ms. With an average transmission rate, the distance determination is subsequently conducted with less precision, but with a reduced complexity of the processing components.

The electronic key receives this coded base signal, demodulates it and decrypts it in order to parameterise the analysis conducted in the processing unit of the electronic key. Since the two oscillators of the device and the key are not yet calibrated, the synchronisation on reception of the coded base signal by the electronic key is still a fuzzy synchronisation. On reception of the CW signal (sent by the key), a calculation of the frequency error of the oscillators is conducted in the processing unit of the unlocking device.

After correction of the frequency of the local oscillator of the device, for example, a new transmission of a first coded response signal Response 1 is conducted with time delay from the unlocking device, i.e. after a determined time $T_{R1}$ following the transmission of the rolling code base signal. The first coded response signal is transmitted to the electronic key, wherein this transmission conveys a precise synchronisation. The electronic key receives this first scrambled response signal from the unlocking device, for example, in a time window for reception that is equivalent to the duration of the first coded response signal.

Following the reception of this first scrambled coded response signal, a processing of the first scrambled response signal is conducted in the processing unit of the electronic key. A calculation of a starting time by a correlation of the awaited first scrambled response signal (decrypted from the initial rolling code) is conducted. This correlation enables the start of the transmission of the second response signal in relation to the arrival of the first response to be aligned precisely. Subsequently, the electronic key generates a second (pseudo-random) scrambled coded response signal, which is transmitted at the end of the processing in the processing unit. The transmission of this second coded response signal is conducted with a good synchronisation and at a high transfer rate of 125 Mbits/s, for example, to the unlocking device.

The unlocking device receives this second coded response signal Response 2, which is scrambled (pseudo-random), in a well synchronised time window of reception by the unlocking device. Subsequently, a correlation of the second coded response signal of the electronic key is conducted in the processing unit of the device with time delay, i.e. after a determined time at the end of the reception of the second (pseudo-random) scrambled coded response signal. This correlation of the second scrambled coded response signal is conducted in accordance with an awaited coding of the response of the electronic key. A calculation of the flight times of the signals between the device and the key and between the key and the device is conducted again in the processing unit. A distance between the electronic key and the unlocking device can be determined again in order to allow opening of the vehicle if the key is properly recognised and is located at a well determined distance in the vicinity of the vehicle in relation to a determined distance threshold.

With this third variant of the secure access process described above, this guarantees high security. This allows detection of any intermediate relay (therefore an additional transmission period) used in an attempt to open the vehicle without the owner of the electronic key knowing. After the electronic key has been recognised, the vehicle can be opened a short time after the processing in the processing unit of the device. The total duration $T_0$ from activation of the electronic key to the complete processing of the information stored in the unlocking device can be in the order of 10 ms.

Figure 5:
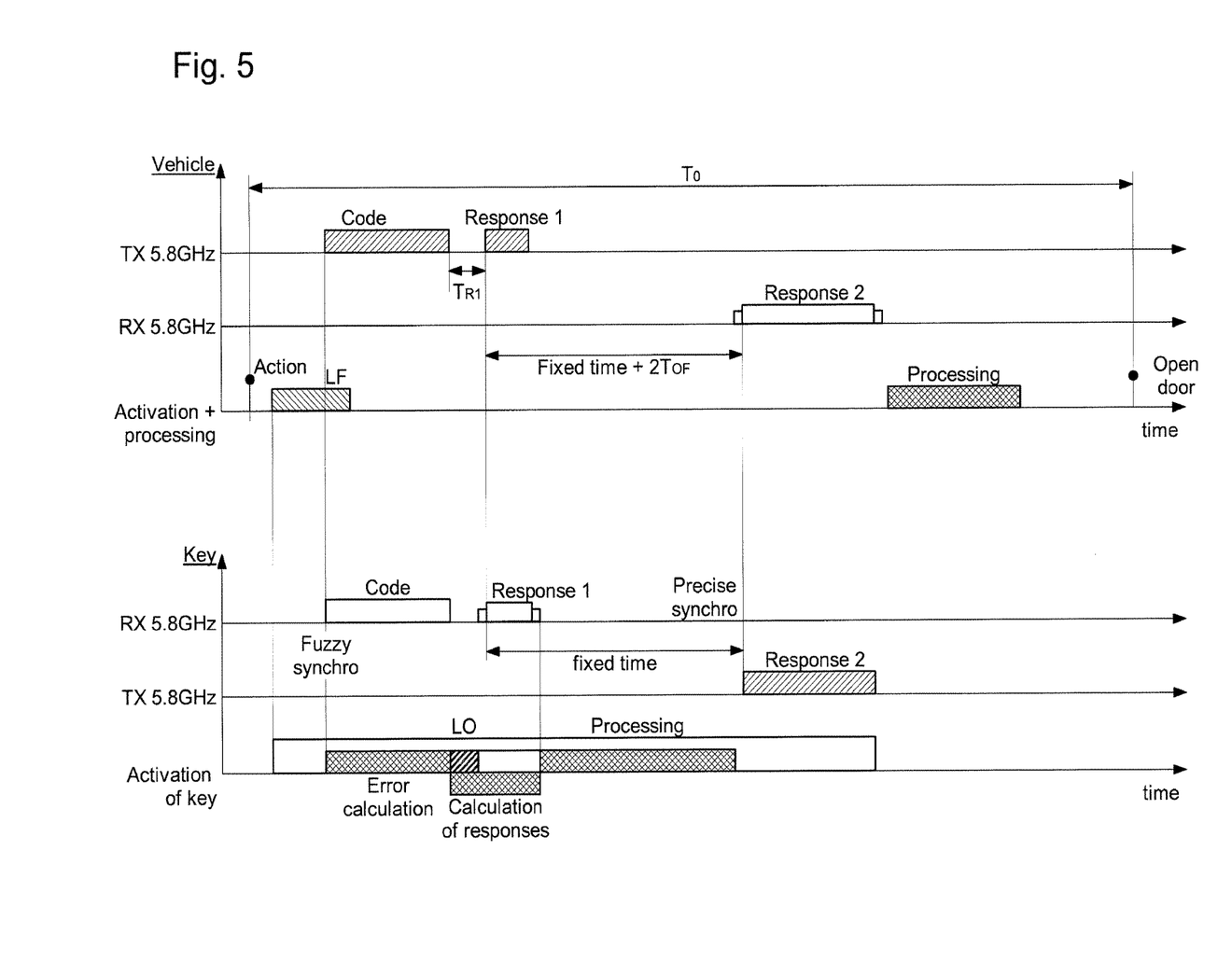
FIG. 5 shows different signals transmitted and received between the access device and the wearable object of the access system of FIG. 1 according to a fourth variant of the secure access process according to the invention.

According to a fourth variant of the secure access process according to FIG. 5, secure distance measurements and a security check are conducted. Firstly, the electronic key is activated by the LF low-frequency signal transmitted by the unlocking device. Following the LF activation signal, the unlocking device transmits a base signal Code, which is a rolling code signal at an average transfer rate in the order of 1 Mbits/s or a rolling code or random encrypted signal with a symmetric or asymmetric key. This transmission of the base signal is longer than the transmission of the base signal of the first and second variants of the process, e.g. in the order of 1 ms.

The electronic key receives this coded base signal, demodulates it and decrypts it. Since the transfer rate, and therefore the band width, are reduced during this first transmission, the synchronisation on reception of the coded base signal by the electronic key is again a fuzzy synchronisation. In its processing unit, the electronic key conducts a calculation of frequency error of the unlocking device to the electronic key on the basis of the received rolling code base signal. After this processing a correction of the frequency of the local oscillator of the key occurs.

A transmission of a first coded response signal Response 1 is conducted with time delay from the unlocking device, i.e. after a determined time $T_{R1}$ following the transmission of the rolling code base signal. This first coded response signal is a pseudo-random noise coded signal PN, which is at a very high rate, e.g. in the order of 125 Mbits/s. The first coded response signal is transmitted to the electronic key to have a precise synchronisation after correlation in the electronic key. This received coded signal PN is stored in a register of a memory of the electronic key. The electronic key receives this first response signal PN from the unlocking device in a well defined time window for reception.

On reception of this first response signal PN, a correlation of the first response of the unlocking device with the PN sequence deduced from the initial rolling code is conduced in the processing unit of the key. This correlation enables precise definition of the time of transmission of a second pseudo-random noise coded signal PN (which is at a very high rate, e.g. in the order of 125 Mbits/s) after a determined time from the transmission of the first coded response signal from the device to the transmission of the electronic key. In addition to the fixed time, this determined time takes into account the flight times of the signals between the device and the electronic key and between the key and the device. A precise synchronisation is obtained at the moment of the transmission of the second pseudo-random noise coded signal PN, which is at a very high rate, e.g. in the order of 125 Mbits/s.

The unlocking device receives this second pseudo-random noise coded signal PN in a well synchronised time window for reception and stores the information of the second response of the electronic key in a first register of a memory. The duration of reception in the reception window of the device is equivalent to the duration of the second response signal of the electronic key. Following reception of the second response signal from the key, a correlation with the known PN code of the second response Response 2 from the electronic key is conducted in the processing unit of the device. A secure calculation of the flight times is determined again in order to also determine the distance separating the electronic key from the unlocking device to allow the vehicle to be opened a short time after if the electronic key is recognised. The time $T_0$ between activation of the key and opening of the door of the vehicle can be in the order of 10 ms.

It should noted that the duration of the second response that is transmitted from the key to the vehicle can be longer than the first response that is transmitted from the vehicle to the key. This therefore allows the correlation gain to be increased and, advantageously the transmission power of the key to be reduced by keeping a signal-to-noise ratio similar to that of the vehicle-key transmission where it is easier to obtain power.

It should also be noted that all the steps of the different variants of the secure access process described above can be repeated in succession to allow the vehicle to be opened solely by the personalised electronic key of said vehicle.

Working from the above description, several variants of the process and system for secure access to a determined space can be envisaged by a person skilled in the art without departing from the framework of the invention defined by the claims. An antenna for transmission of communication signals at a first high frequency and an antenna for reception of the communication signals at a second high frequency can be provided in the access or unlocking device and in the electronic key. It should be noted that several switched antennas are also conceivable for each variant of the secure access system. Therefore, this allows the use of a topology with a diversity of antennas well known to the person skilled in the art during the course of several successive phases of operation of the system through different antennas.

What is claimed is:

1. A process for secure access to a determined space equipped with an access or unlocking device by a personalized wearable object through a wireless signal communication, wherein the access or unlocking device comprises a transmitter of radiofrequency signals at high frequency, a receiver of radiofrequency signals at high frequency, a processor and a local oscillator to clock operations of the access or unlocking device, and the wearable object comprises a transmitter of radiofrequency signals at high frequency, a receiver of radiofrequency signals at high frequency, a processor and a local oscillator to clock operations of the wearable object, wherein the process comprises:
   activating the wearable object,
   transmitting a first coded signal from the access or unlocking device,
   receiving the first coded signal from the access or unlocking device in the wearable object to demodulate a code of the first coded signal and prepare a coded response signal in order to transmit the coded response signal with synchronization to the access or unlocking device after a defined time of transmission following initiation of the first coded signal in the access or unlocking device, and the defined time of transmission is a time following the initiation of the first coded signal in the access or unlocking device until transmission of the coded response signal from the wearable object and is a time obtained by a defined time delay that is locked into the access or unlocking device,
   receiving the coded response signal from the wearable object in the access or unlocking device, and
   processing a converted coded response signal in the processor of the access or unlocking device by checking the defined time delay and the coded response signal of the wearable object in order to determine flight times of the first coded signal and the coded response signal between the access or unlocking device and the wearable object and deducing therefrom a calculated distance separating the wearable object and the access or unlocking device to authorize access to the determined space when the calculated distance is below a determined threshold after recognition of the wearable object.

2. The secure access process according to claim 1, wherein the wearable object is deactivated at an end of transmission of the coded response signal or just before the processing of the converted coded response signal in the processor of the access or unlocking device.

3. The secure access process according to claim 1, wherein the local oscillator of the access or unlocking device generates an oscillation signal at a frequency similar to an oscillation signal generated by the local oscillator of the wearable object.

4. The secure access process according to claim 1, wherein the defined time delay is locked into the access or unlocking device on transmission of the first coded signal to allow reception of the coded response signal of the wearable object to be checked and to allow the flight times of the first coded signal and the coded response signal and the calculated distance separating the access or unlocking device and the wearable object to be determined precisely, and wherein the defined time of transmission is determined from transmission of the first coded signal.

5. The secure access process according to claim 1, wherein the processing in the processor of the access or unlocking device is conducted with time delay after reception of the coded response signal from the wearable object.

6. The secure access process according to claim 1, wherein the access or unlocking device receives the coded response signal from the wearable object in a reception window adjusted to a duration of the coded response signal and synchronized with transmission of the coded response signal from the wearable object.

7. The secure access process according to claim 1, wherein the access or unlocking device transmits the first coded signal, which is a rolling code signal or a pseudo-random noise coded signal, which is encryptable with a symmetric or asymmetric key, and wherein the wearable object transmits a scrambled coded response signal with an additional modulation of data.

8. The secure access process according to claim 1, wherein a frequency of the first coded signal transmitted through an antenna of the access or unlocking device is at a frequency that is an order of 5.8 GHz and equal to a frequency of the coded response signal transmitted through an antenna of the wearable object, and wherein the first coded signal is at a high transmission rate that is an order of 26 Mbits/s or 125 Mbits/s.

9. A system for secure access to a determined space by a wearable object for implementing the secure access process according to claim 1, in which the system comprises:
   an access or unlocking device, and
   a personalized wearable object for a wireless signal communication with the access or unlocking device, wherein
   the access or unlocking device comprises a transmitter of radiofrequency signals at high frequency, a receiver of radiofrequency signals at high frequency, a processor and a local oscillator to clock operations of the access or unlocking device, and
   the wearable object comprises a transmitter of radiofrequency signals at high frequency, a receiver of radiofrequency signals at high frequency, a processor and a local oscillator to clock the operations of the wearable object, wherein
   the receiver of the wearable object is to receive a first coded signal from the access or unlocking device, the processor of the wearable object is configured to demodulate a code of the first coded signal and to prepare a coded response signal, and the transmitter of the wearable object is to transmit the coded response signal with synchronization to the access or unlocking device after a defined time of transmission following initiation of the first coded signal in the access or unlocking device, and the defined time of transmission is a time following the initiation of the first coded signal in the access or unlocking device until transmission of the coded response signal from the wearable object and is a time obtained by a defined time delay that is locked into the access or unlocking device, and
   the processor of the access or unlocking device is configured to process a converted coded response signal by checking the defined time delay and the coded response signal of the wearable object in order to determine flight times of the first coded signal and the coded response signal between the access or unlocking device and the wearable object to deduce therefrom a calculated distance separating the wearable object and the access or unlocking device and to authorize access to the determined space when the calculated distance is below a determined threshold after recognition of the wearable object.

10. The secure access system according to claim 9, wherein the local oscillator of the access or unlocking device is a quartz crystal oscillator, and for which the local oscillator of the wearable object is a quartz crystal oscillator similar to the quartz crystal of the access or unlocking device.

11. The secure access system according to claim 9, wherein the high frequency of the radiofrequency signals is an order of 5.8 GHz.

12. The secure access system according to claim 9, wherein the transmitter and the receiver of the access or unlocking device are connected by a switching element in a form of a multiplexer with a single antenna for transmission and reception of signals at high frequency, and wherein the transmitter and the receiver of the wearable object are connected by a switching element in a form of a multiplexer with a single antenna for transmission and reception of signals at the same high frequency.

13. The secure access system according to claim 9, wherein the access or unlocking device is arranged in a vehicle, and wherein the wearable object is an electronic key, which is activatable by manual action on a button or touch of the electronic key, or activated by a low-frequency wake up signal transmitted by the access or unlocking device.

14. A process for secure access to a determined space equipped with an access or unlocking device by a personalized wearable object through a wireless signal communication, wherein the access or unlocking device comprises a transmitter of radiofrequency signals at high frequency, a receiver of radiofrequency signals at high frequency, a processor and a local oscillator to clock operations of the access or unlocking device, and the wearable object comprises a transmitter of radiofrequency signals at high frequency, a receiver of radiofrequency signals at high frequency, a processor and a local oscillator to clock operations of the wearable object, wherein the process comprises:
   activating the wearable object,
   transmitting a first coded signal from the access or unlocking device,
   receiving the first coded signal from the access or unlocking device in the wearable object to demodulate a code of the first coded signal and prepare a coded response signal in order to transmit the coded response signal with synchronization to the access or unlocking device after a defined time of transmission following initiation of the first coded signal in the access or unlocking device,
   receiving the coded response signal from the wearable object in the access or unlocking device, and
   processing a converted coded response signal in the processor of the access or unlocking device by checking a defined time delay and the coded response signal of the wearable object in order to determine flight times of the first coded signal and the coded response signal between the access or unlocking device and the wearable object and deducing therefrom a calculated distance separating the wearable object and the access or unlocking device to authorize access to the determined space when the calculated distance is below a determined threshold after recognition of the wearable object,
   wherein the access or unlocking device transmits the first coded signal, which is a rolling code signal or a pseudo-random noise coded signal and which is encryptable with a symmetric or asymmetric key, with a determined time interval after activation of the wearable object, wherein said rolling code signal or pseudo-random noise coded signal received and decrypted by the wearable object enables preparation of the coded response signal to be transmitted after the defined time of transmission.

15. A process for secure access to a determined space equipped with an access or unlocking device by a personalized wearable object through a wireless signal communication, wherein the access or unlocking device comprises a transmitter of radiofrequency signals at high frequency, a receiver of radiofrequency signals at high frequency, a processor and a local oscillator to clock operations of the access or unlocking device, and the wearable object comprises a transmitter of radiofrequency signals at high frequency, a receiver of radiofrequency signals at high frequency, a processor and a local oscillator to clock operations of the wearable object, wherein the process comprises:

activating the wearable object, transmitting a first coded signal from the access or unlocking device, receiving the first coded signal from the access or unlocking device in the wearable object to demodulate a code of the first coded signal and prepare a coded response signal in order to transmit the coded response signal with synchronization to the access or unlocking device after a defined time of transmission following initiation of the first coded signal in the access or unlocking device, receiving the coded response signal from the wearable object in the access or unlocking device, and processing a converted coded response signal in the processor of the access or unlocking device by checking a defined time delay and the coded response signal of the wearable object in order to determine flight times of the first coded signal and the coded response signal between the access or unlocking device and the wearable object and deducing therefrom a calculated distance separating the wearable object and the access or unlocking device to authorize access to the determined space when the calculated distance is below a determined threshold after recognition of the wearable object, wherein the access or unlocking device transmits the first coded signal, which is a rolling code signal or a pseudo-random noise coded signal, which is encryptable with a symmetric or asymmetric key, and wherein the wearable object transmits a scrambled coded response signal with an additional modulation of data, and wherein a frequency of the first coded signal transmitted through an antenna of the access or unlocking device and a frequency of the scrambled coded response signal transmitted through an antenna of the wearable object are identical in value to an order of 5.8 GHz, wherein the first coded signal is at a high transmission rate that is an order of 26 Mbits/s or 125 Mbits/s, and wherein the additional modulation of data in the scrambled coded response signal is at a lower transmission rate that is an order of 1 Mbits/s.

16. A process for secure access to a determined space equipped with an access or unlocking device by a personalized wearable object through a wireless signal communication, wherein the access or unlocking device comprises a transmitter of radiofrequency signals at high frequency, a receiver of radiofrequency signals at high frequency, a processor and a local oscillator to clock operations of the access or unlocking device, and the wearable object comprises a transmitter of radiofrequency signals at high frequency, a receiver of radiofrequency signals at high frequency, a processor and a local oscillator to clock operations of the wearable object, wherein the process comprises:

activating the wearable object, transmitting a first coded signal from the access or unlocking device, receiving the first coded signal from the access or unlocking device in the wearable object to demodulate a code of the first coded signal and prepare a coded response signal in order to transmit the coded response signal with synchronization to the access or unlocking device after a defined time of transmission following initiation of the first coded signal in the access or unlocking device, receiving the coded response signal from the wearable object in the access or unlocking device, and processing a converted coded response signal in the processor of the access or unlocking device by checking a defined time delay and the coded response signal of the wearable object in order to determine flight times of the first coded signal and the coded response signal between the access or unlocking device and the wearable object and deducing therefrom a calculated distance separating the wearable object and the access or unlocking device to authorize access to the determined space when the calculated distance is below a determined threshold after recognition of the wearable object, and in which the local oscillator of the access or unlocking device is a quartz crystal oscillator, and in which the local oscillator of the wearable object is a quartz crystal oscillator similar to the quartz crystal of the access or unlocking device, wherein the first coded signal is transmitted by the access or unlocking device and received by the wearable object, which conducts a parameterization for an analysis in the processor of the wearable object, wherein after transmission of the first coded signal, a coded response signal of the access or unlocking device scrambled by an additional modulation is generated and transmitted by the access or unlocking device with time delay, wherein the wearable object receives the scrambled coded response signal from the access or unlocking device in a first time window for reception adjusted to a duration of the scrambled coded response signal of the access or unlocking device, wherein a processing of the scrambled coded response signal of the access or unlocking device is conducted after conversion in the processor of the wearable object with time delay for generation and transmission of the coded response signal from the wearable object scrambled by an additional modulation, wherein the access or unlocking device receives the scrambled coded response signal from the wearable object in a second time window for reception of the access or unlocking device adjusted to a duration of the scrambled coded response signal from the wearable object, and wherein a processing of the converted scrambled coded response signal of the wearable object is conducted with time delay in the processor of the access or unlocking device for calculation of the flight times and the distance between the access or unlocking device and the wearable object.

17. The secure access process according to claim 16, wherein once activated, the wearable object transmits a continuous carrier frequency signal, which is received by the access or unlocking device before transmission of the first coded signal, wherein a calculation of frequency error of the local oscillator of the wearable object in relation to the local oscillator of the access or unlocking device is conducted in the processor of the access or unlocking device, wherein in parallel with the frequency error calculation, the first coded signal is transmitted by the access or unlocking device, and wherein the scrambled coded response signal of the access or unlocking device is transmitted with a precise synchronization request.

18. The secure access process according to claim 16, wherein a frequency of the first coded signal and the coded response signal transmitted and received by the access or unlocking device and the wearable object are at a frequency that is an order of 5.8 GHz, wherein a data transfer rate of the first coded signal, which is a rolling code signal or a pseudo-random noise coded signal transmitted by the access or unlocking device, is 1 Mbits/s, and wherein the scrambled coded response signals, which are defined by pseudo-random noise coded signals, are at a transfer rate that is an order of 26 Mbits/s or 125 Mbits/s with an additional modulation of 1 Mbits/s.

19. The secure access process according to claim 16, wherein the first coded signal, which is a rolling code signal of the access or unlocking device, is received by the wearable object and a calculation of frequency error of the local oscillator of the access or unlocking device in relation to the local oscillator of the wearable object is conducted in the processor of the wearable object, wherein the processor of the wearable object calculates a transmission time of the scrambled coded response signal of the wearable object from transmission of the scrambled coded response signal of the access or unlocking device to define a precise synchronization during transmission of the scrambled coded response signal of the wearable object received in the second time window for reception of the access or unlocking device.

* * * * *